(12) United States Patent  
Decesaris et al.

(10) Patent No.: US 8,984,196 B2  
(45) Date of Patent: Mar. 17, 2015

(54) ACCESSING PERIPHERAL DEVICES

(75) Inventors: Michael Decesaris, Carrboro, NC (US); Luke D. Remis, Raleigh, NC (US); Gregory D. Sellman, Morrisville, NC (US); Steven L. Vanderlinden, Chapel Hill, NC (US)

(73) Assignee: Lenovo Enterprise Solutions (Singapore) Ptd. Ltd., Singapore (SG)

( * ) Notice: Subject to any disclaimer, the term of this patent is extended or adjusted under 35 U.S.C. 154(b) by 262 days.

(21) Appl. No.: 13/445,235

(22) Filed: Apr. 12, 2012

(65) Prior Publication Data

US 2013/0275636 A1  Oct. 17, 2013

(51) Int. Cl.  
*G06F 13/00* (2006.01)

(52) U.S. Cl.  
USPC ........................................ 710/110

(58) Field of Classification Search  
CPC ........... G06F 12/10; G06F 12/02; G11C 8/10; G11C 11/408; G11C 16/08  
USPC ........................................ 710/110  
See application file for complete search history.

(56) References Cited

U.S. PATENT DOCUMENTS

| | | | | |
|---|---|---|---|---|
| 3,288,932 | A * | 11/1966 | Cleary et al. | 379/253 |
| 3,529,243 | A * | 9/1970 | Reindl | 370/280 |
| 3,746,991 | A * | 7/1973 | Gautney | 455/218 |
| 5,680,394 | A * | 10/1997 | Bingham et al. | 370/294 |
| 6,931,470 | B2 | 8/2005 | Ballantyne et al. | |
| 7,397,717 | B2 | 7/2008 | Chen et al. | |
| 7,689,740 | B2 | 3/2010 | Chou | |
| 8,433,838 | B2 * | 4/2013 | Crockett et al. | 710/110 |
| 2005/0172059 | A1 * | 8/2005 | Yoshimura et al. | 710/110 |
| 2008/0005408 | A1 | 1/2008 | Yen et al. | |
| 2011/0060856 | A1 | 3/2011 | Huang et al. | |
| 2011/0078350 | A1 * | 3/2011 | Carls | 710/110 |
| 2011/0239033 | A1 | 9/2011 | Chen | |

FOREIGN PATENT DOCUMENTS

JP    2008186185 A * 8/2008

OTHER PUBLICATIONS

Anonymous, "High-Speed Adaptive Sampling Using an SPI Module," Jan. 12, 2006, IPCOM000133087D, www.ip.com.  
Anonymous, "SDIO Emulation Over SPI Without SPI Mode in SDHC Master," Jul. 22, 2010, IPCOM000197935D, www.ip.com.  
IBM, "Method and Apparatus for Designing Flexibility Into Key Chip and System Parameters Using a Software Controlled Clock Generator," Nov. 10, 2004, IPCOM000032710D, www.ip.com.  
T. Kalinka, "Synchronous Serial Communications Via Three Ports," New Electronics, vol. 20, No. 8, 23-24, 26, 28, Apr. 14, 1987.

* cited by examiner

*Primary Examiner* — Paul R Myers  
(74) *Attorney, Agent, or Firm* — Law Office of Jim Boice (57) ABSTRACT

A hardware system comprises a master device and a slave device that are coupled by a signal line. A frequency generator in the master device places a selected frequency signal on the signal line. A frequency detector/comparator in the slave device, which is coupled to the signal line, determines whether the selected frequency signal on the signal line matches a predetermined frequency for the slave device. If the selected frequency signal matches the predetermined frequency, then a chip select node on the slave device is enabled, in order to permit a data exchange session between the master device and the slave device.

11 Claims, 5 Drawing Sheets

ACCESSING PERIPHERAL DEVICES

BACKGROUND

The present disclosure relates to the field of computing hardware, and specifically to hardware peripheral devices. Still more specifically, the present disclosure relates to a design structure for selectively accessing hardware peripheral devices.

Serial peripheral interface (SPI) is a serial interface that exchanges data between two devices, commonly known as a master device and a slave device. As their names suggest, the master device initiates a communication session with the slave device, which is then able to transmit data back to the master device as long as the session is active. The master device may be implemented in various forms including a Multipoint Control Unit (MCU). The MCU couples one or more slave devices to another device (e.g., a processor), or the MCU may be the terminus for the connection. Examples of slave devices include, but are not limited to, an analog-to-digital converter (ADC), a digital-to-analog converter (DAC), a memory (e.g., an EPROM, an EEPROM, FLASH memory, etc.), a sensor (e.g., a thermometer, a pressure gauge, etc.), etc. In addition, the master device and the slave device(s) may be part of a system-on-a chip (SOC) processor, as well as other types of very large-scale integrated circuit (VLSIC) designs.

SUMMARY

In one embodiment of the present invention, a system comprises a master device and a slave device that are coupled by a signal line. A frequency generator in the master device places a selected frequency signal on the signal line. A frequency detector/comparator in the slave device, which is coupled to the signal line, determines whether the selected frequency signal on the signal line matches a predetermined frequency for the slave device. If the selected frequency signal matches the predetermined frequency, then a chip select node on the slave device is enabled, in order to permit a data exchange session between the master device and the slave device.

In one embodiment of the present invention, a hardware description language (HDL) design structure is encoded on a machine-readable data storage medium. The HDL design structure comprises elements that, when processed in a computer-aided design system, generate a machine-executable representation of a system that comprises a master device and a slave device that are coupled by a signal line. A frequency generator in the master device places a selected frequency signal on the signal line. A frequency detector/comparator in the slave device, which is coupled to the signal line, determines whether the selected frequency signal on the signal line matches a predetermined frequency for the slave device. If the selected frequency signal matches the predetermined frequency, then a chip select node on the slave device is enabled, in order to permit a data exchange session between the master device and the slave device.

In one embodiment, a hardware-implemented method of selectively establishing a data communication session between a master device and a slave device in a hardware system comprises: a master device transmitting a selected frequency signal to a slave device, wherein the master device is an integrated circuit (IC) device, and wherein the slave device is a peripheral chip device in the hardware system; a frequency detector/comparator in the slave device determining whether the selected frequency signal matches a predetermined frequency for the slave device, wherein the frequency detector/comparator is coupled to the signal line; and the frequency detector/comparator enabling a chip select node on the slave device, wherein the chip select node is coupled to the frequency detector/comparator, and wherein the chip select node, in response to the frequency detector/comparator determining that the selected frequency signal on the signal line matches the predetermined frequency for the slave device, is enabled to permit a data exchange session between the master device and the slave device.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
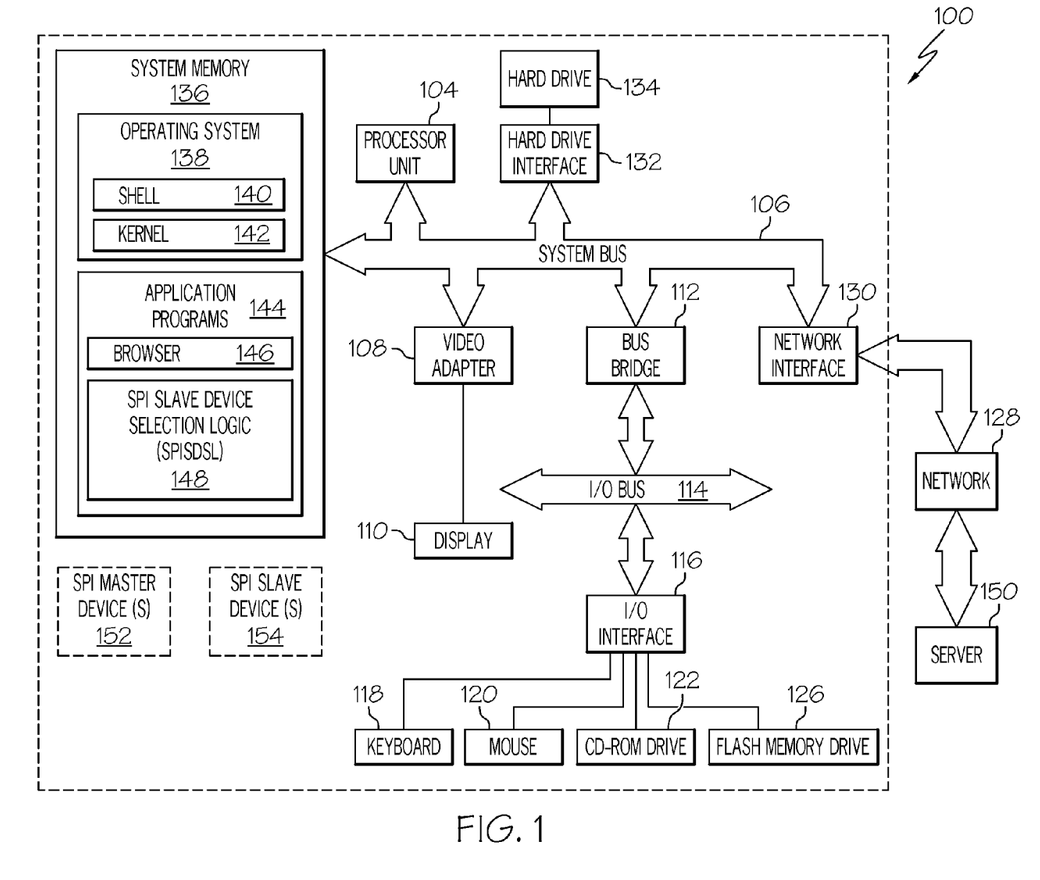
FIG. 1 depicts an exemplary physical computer in which the present invention may be implemented and/or utilized.

With reference now to FIG. 1, there is depicted a block diagram of an exemplary computer 100, with which and/or in which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®—UNIX is a registered trademark of The Open Group in the United States and other countries), also called a command processor in Windows® (WINDOWS is a registered trademark of Microsoft Corporation in the United States and other countries), is a program that provides an interpreter and an interface between the user and the operating system, and is generally the highest level of the operating system software hierarchy and serves as a command interpreter. Thus, shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a Serial Peripheral Interface Slave Device Selection Logic (SPISDSL) 148, which, in one embodiment, executes the process described below in FIG. 4 and/or FIG. 5. In one embodiment, computer 100 is able to download SPISDSL 148 from service provider server 150, preferably in an "on demand" basis.

Note that computer 100 also includes Serial peripheral interface (SPI) master device(s) 152 and SPI slave device(s) 154. As suggested by their dashed line notations, these devices may be standalone components of computer 100, or they may be components that have been previously shown/discussed in FIG. 1. For example, a SPI master device 152 may be processor unit 104 (or at least a component of processor unit 104), while SPI slave devices 154, which are slaves to a master such as processor unit 104, may be one or more of elements 118, 120, 122, and 126. Similarly, video adapter 108 may be, or comprise, SPI master device 152, such that its SPI slave device 154 is display 110.

The hardware elements depicted in computer 100 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention. Note that the hardware architecture for service provider server 150 may be substantially similar to that shown for computer 100.

Figure 2:
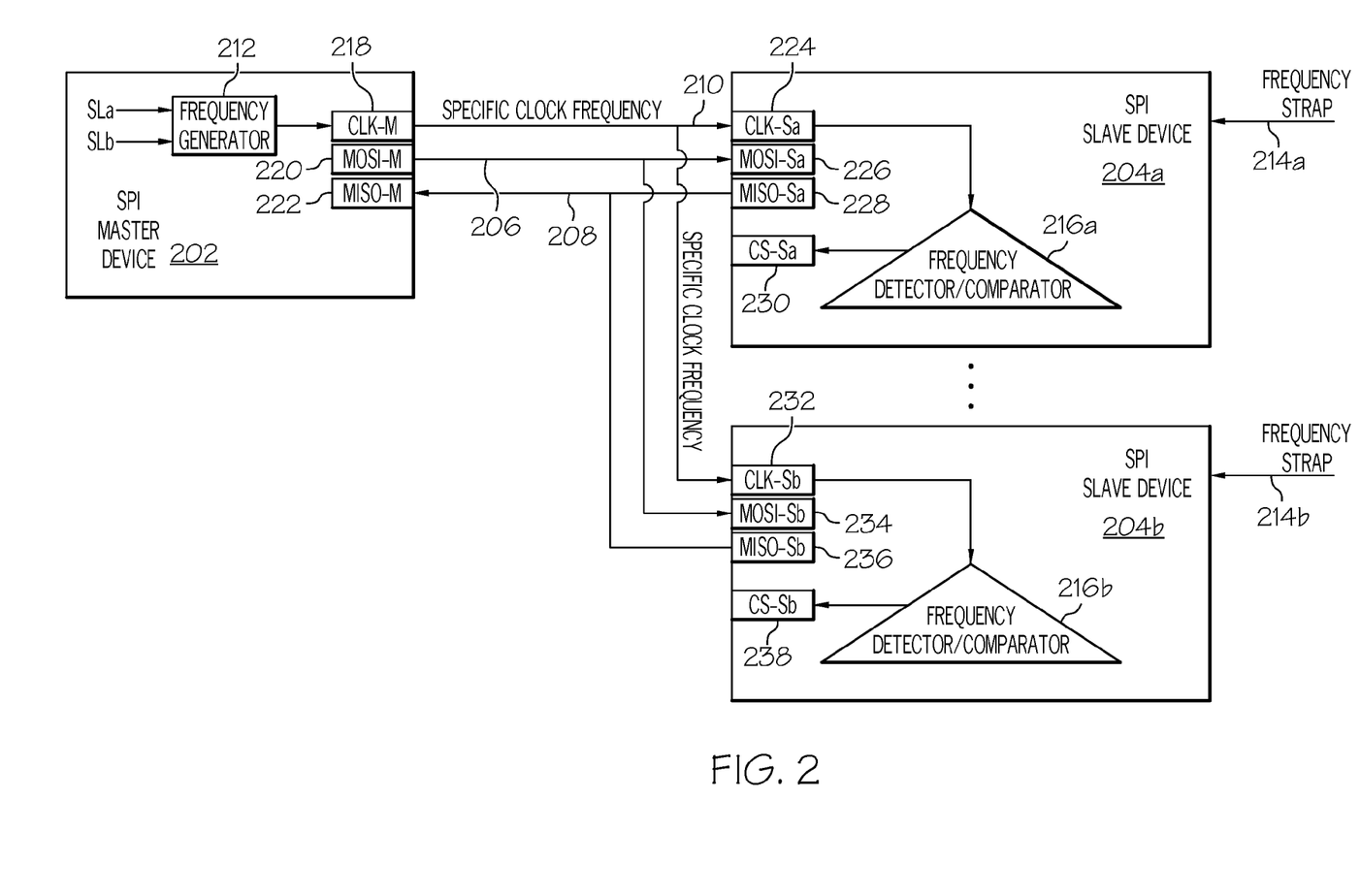
FIG. 2 illustrates an exemplary serial peripheral interface (SPI) system that uses no dedicated slave chip select lines.

Referring now to FIG. 2, an exemplary serial peripheral interface (SPI) system utilizing the novelty of the present invention is presented. An SPI master device 202, which is an integrated circuit (IC) device such as a standalone Multipoint Control Unit (MCU) SPI device, or which may be an IC component of another IC device (e.g., a processor, a field programmable gate array (FPGA), etc.), is coupled to multiple SPI slave devices 204a-204b (where "b" is an integer). Examples of slave devices include, but are not limited to, an analog-to-digital converter (ADC), a digital-to-analog converter (DAC), a memory (e.g., an EPROM, an EEPROM, FLASH memory, etc.), a sensor (e.g., a thermometer, a pressure gauge, etc.), etc. The SPI master device 202 and the SPI slave devices 204a-204b may be part of a computer system such as computer 100 shown in FIG. 1, or they may be part of a system-on-a chip (SOC) processor, a very large-scale integrated circuit (VLSIC) design, etc.

As depicted, two data lines communicatively connect the SPI master device 202 to the multiple SPI slave devices 204a-204b. The first data line is a master out slave in (MOSI) line 206, which connects the MOSI-M(Master) node 220 (i.e., connector hardware pin and associated communication port) in the SPI master 202 to the MOSI-S(Slave) node (i.e., connector hardware pin and associated communication port) in each of the SPI slave devices 204a-204b (i.e., MOSI-Sa node 226, and MOSI-Sb node 234). The MOSI line 206 is dedicated to carrying data from the SPI master device 202 to the SPI slave devices 204a-204b. The second data line is a master in slave out (MISO) line 208, which connects the MISO-S(Slave) nodes (e.g., MISO-Sa node 228 and MISO-Sb node 236) in each of the SPI slave devices 204a-204b to the MISO-M(Master) node 222 in the SPI master 202.

Thus, a single MOSI-M node 220 in the SPI master device 202 is coupled to both the MOSI-Sa node 226 in SPI slave device 204a as well as the MOSI-Sb node 234 in SPI slave device 204b. Similarly, a single MISO-M node 222 in the SPI master device 202 is coupled to both the MISO-Sa node 228 in SPI slave device 204a as well as the MISO-Sb node 236 in SPI slave device 204b. However, in most SPI scenarios, the SPI master device 202 only wants to communicate with one or the other of the SPI slave devices 204a-204b. In order to establish such a singular communication session, the chip select (CS) pin on the desired SPI slave device, also referred to as a slave select (SS) pin, is enabled. For example, if the SPI master device 202 wanted to have a MOSI/MISO communication session with SPI slave device 204a, then the CS-Sa node (pin) 230 would be enabled. This node/pin enablement opens the ports for MOSI-Sa node 226 and MISO-Sa node 228, thus enabling the communication session. In a traditional SPI system, there would be a separate wire going from each CS/SS slave pin on the SPI slave devices 204a-204b to a separate CS/SS master pin on the SPI master device 202 (i.e., every CS/SS slave pin would be wired to a different CS/SS master pin on the master device 202). While this would not be unduly burdensome if there were only two SPI slave devices 204a-204b (as depicted for clarity in FIG. 2), there are often 10-20 SPI slave devices in an SPI system. If a separate line/wire were to go from the SPI master device 202 to each of the SPI slave devices 204a-204b in such a scenario, the board space demands from these lines/wires would be problematic. That is, a traditional SPI system typically allocates only one or two CS/SS master pins on a processor (i.e., the SPI master), due to limited input/output (I/O) pin space on a board, board mating connectors, etc. Thus, the present invention eliminates these lines/wires, such that any number of SPI slave devices can be managed by a single SPI master device, in the following manner.

Besides being connected by MOSI line 206 and MISO line 208, SPI master device 202 is connected to the SPI slave devices 204a-204b by a clock line 210. Clock line 210 is a signal line that carries only a frequency signal that communicates no data. That is, no data (e.g., either analog data or binary digital data of "1's" and "0's") is carried on the signal line that is clock line 210. Rather, only a frequency signal (i.e., a specifically set clock frequency) is sent over the clock line 210. However, the bandwidth of the frequency signal is selectively generated by a frequency generator 212 at the SPI master device 202. That is, a specific clock frequency is generated by the frequency generator 212 according to an input to the frequency generator according to a predetermined frequency for a particular SPI slave device.

For example, assume that it is desired for the SPI master device 202 to have a communication session with SPI slave device 204a. In this example, an input SLa (for SPI slave device 204a) into frequency generator 212 causes a specific clock frequency (e.g., 110 Mhz) to be placed on the clock line 210. The input SLa may be selected over SLb using a multiplexor or any other switching device that selectively inputs a signal indicating that a specific frequency, which will ultimately enable a MOSI/MISO session as described herein, is to be generated for a particular SPI slave device. Assume that a frequency strap 214a (i.e., a software or hardware controlled input to frequency detector/comparator 216a in SPI slave device 204a) has programmed frequency detector/comparator 216a to watch for the specific clock frequency of 110 Mhz. In response to frequency detector/comparator 216a detecting the 110 Mhz clock signal at its CLK-Sa node 224, and then determining that this frequency matches the predetermined frequency provided by frequency strap 214a, the frequency detector/comparator 216a sends a signal to the CS-Sa node 230, causing the MOSI-Sa node (pin/port) 226 and MISO-Sa node (pin/port) 228 to be enabled, thus establishing an SPI communication session between the SPI master device 202 and SPI slave device 204a.

Assume further that frequency strap 214b has programmed frequency detector/comparator 216b in SPI slave device 204b to watch for a different clock frequency (e.g., 120 Mhz). As such, the frequency detector/comparator 216b in SPI slave device 204b will ignore the 110 Mhz signal at its CLK-Sb node (pin/port) 232, and thus will not enable the CS-Sb node 238 in SPI slave device 204b, such that there is no MOSI/MISO communication session between SPI slave device 204b and SPI master device 202.

One advantage of the system depicted in FIG. 2 is that there is no master CS/SS pin on the SPI master device 202, and there are no CS/SS wires going to each SPI slave device 204a-204b. However, the system depicted in FIG. 2 must vary the clock bandwidth placed on the clock line 210 (and thus used by the different SPI slave devices 204a-204b), which may cause timing problems during downstream communication (i.e., to other devices other than the SPI devices shown in FIG. 2), as well as timing problems during certain execution operations (due to varying data reception issues). Furthermore, high frequency (e.g., over 100 Mhz) detectors are often expensive and/or difficult to produce. Furthermore, in a system having unbalanced data rates (due to different clock speeds from the clock line 210), internal operations that are clocked by the signal from the clock line 210 may run into operation/transmission collisions, due to timing issues. For example, if one system (e.g., "slave A") requires 20 seconds to perform an update, if the other (e.g., "slave B") ran at half speed, it would take 40 seconds. To counter this delay, frequency can be varied by fine increments (e.g., 75 Mhz, 76 Mhz, 77 Mhz, etc.).

Figure 3:
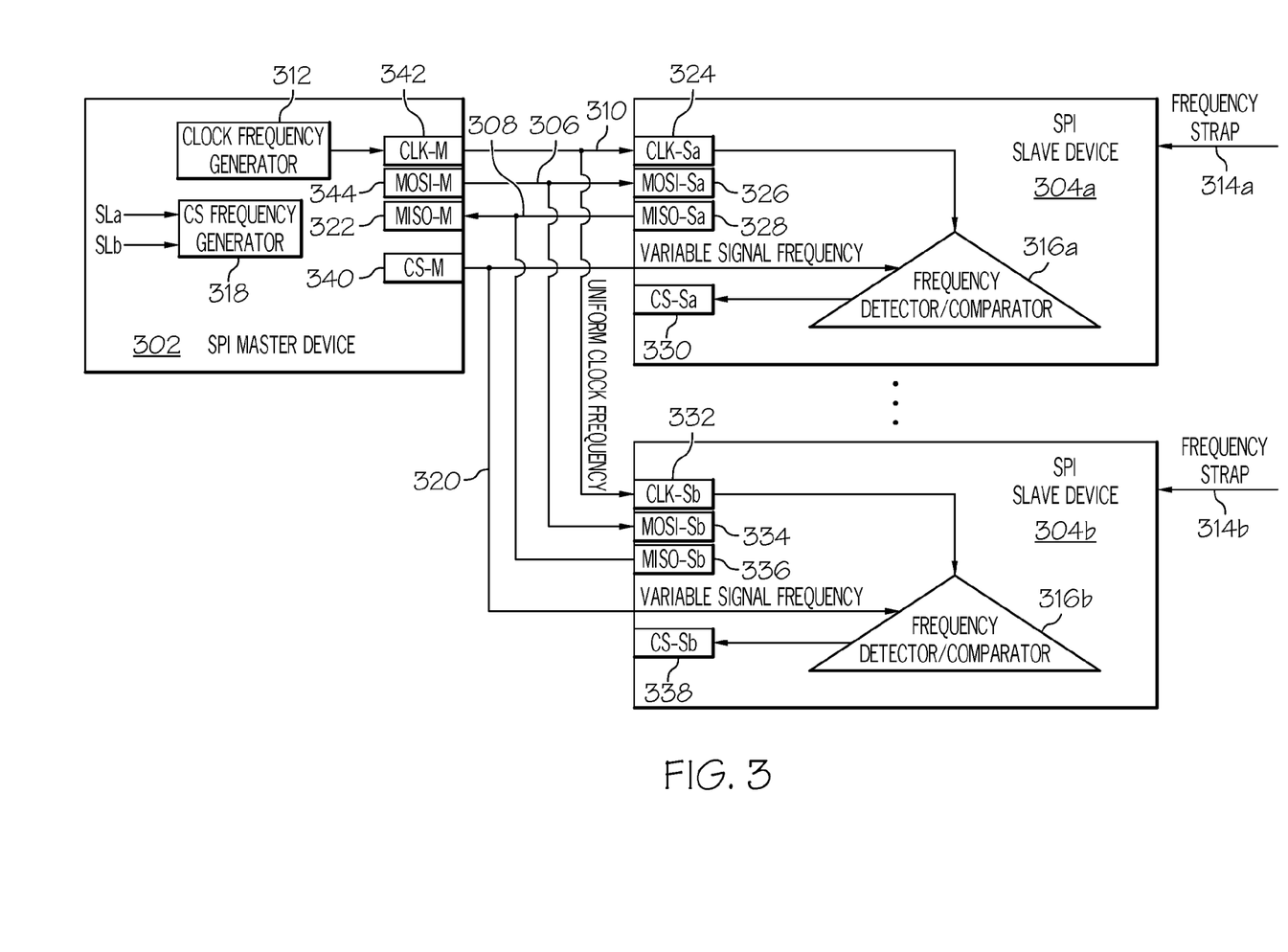
FIG. 3 depicts an exemplary SPI system that utilizes a single serial chip select line between an SPI master device and multiple SPI slave devices.

With reference then to FIG. 3, another embodiment of the present invention utilizes a different signal line to control the SPI slave devices. As in the system shown in FIG. 2, the system shown in FIG. 3 also uses a MOSI line 306 and a MISO line 308, which are analogous to the MOSI line 206 and the MISO line 208 shown in FIG. 2. However, in the embodiment shown in FIG. 3, a clock frequency generator 312 in the SPI master device 302 places a uniform clock frequency on clock line 310, which is received by the respective CLK-S node (e.g., CLK-Sa node 324 and CLK-Sb node 332) pins/ports on the SPI slave devices 304a-304b(wherein "b" is an integer), rather than being routed through the frequency detectors/comparators 316a-316b. Thus, each of the SPI slave devices 304a-304b receives the same clock signal.

Note that the SPI master device 302 now has a single master Chip Select (CS-M) node (pin/port) 340. However, the output from this CS-M node 340 is not simply an on/off signal (as in prior art SPI masters), but rather is a special frequency (generated by chip select (CS) frequency generator 318) that the frequency detectors 316a-316b recognize (according to the frequency that has been programmed by their respective frequency straps 314a-314b). For example, assume that an input SLa has instructed CS frequency generator 318 to generate a 10 khz signal (according to an SLa input being selectively input into CS frequency generator 318 instead of SLb input), and to place this specific signal frequency on chip select line 320. The input SLa may be selected over SLb using a multiplexor or any other switching device that selectively inputs a signal indicating that a frequency, which will ultimately enable a MOSI/MISO session as described herein, is to be generated for a particular SPI slave device. In this example, frequency detector 316a determines that the variable clock frequency received at frequency detector/comparator 316a (from chip select (CS) line 320) matches a predetermined frequency (e.g., 10 khz) set by frequency strap 314a. In response to this determination, the local CS pin (e.g., CS-Sa node 330) is enabled by the frequency detector/comparator 316a, thus allowing a MOSI/MISO communication session between SPI slave device 304a and SPI master device 302.

Note that chip select line 320 is a signal line that carries only a frequency signal that communicates no data. That is, no data (e.g., either analog data or binary digital data of "1's" and "0's") is carried on the signal line that is chip select line 320. Rather, only a frequency signal (i.e., a variable signal frequency that is specific for a particular SPI slave) is sent over the chip select line 320.

Note also that while the SPI slave devices 304a and 304b share a same chip select line 320 to CS-M node 340, the frequency of the signal being placed on the chip select line 320 determines which chip select node is enabled. Therefore, if frequency strap 314b has programmed frequency detector/comparator 316b to watch for a different frequency (e.g., 20 khz) that that which has been placed on the chip select line 320 (i.e., 10 khz in the present example), then SPI slave device 304b ignores the 10 khz that was generated by the CS frequency generator 318 when SLa was used as an input.

Thus, in the embodiment depicted in FIG. 3, the SPI master 302 has a single CS-M node 340, rather than the multiple master CS pin/ports used in the prior art. One advantage of the system shown in FIG. 3 is that a uniform clock speed signal (which the slave device uses to time communication operations) goes to each CLK pin in the SPI slaves (e.g., SPI slave devices 304a-304b), thus negating the need to dynamically adjust for different clock frequencies, as the system shown in FIG. 2 requires. Another advantage of this system shown in FIG. 3 is that the frequency detectors/comparators 316a-316b can operate at slow speeds (e.g., less than 20 khz), and thus are cheaper and more reliable than high speed (e.g., over 100 Mhz) detectors.

Figure 4:
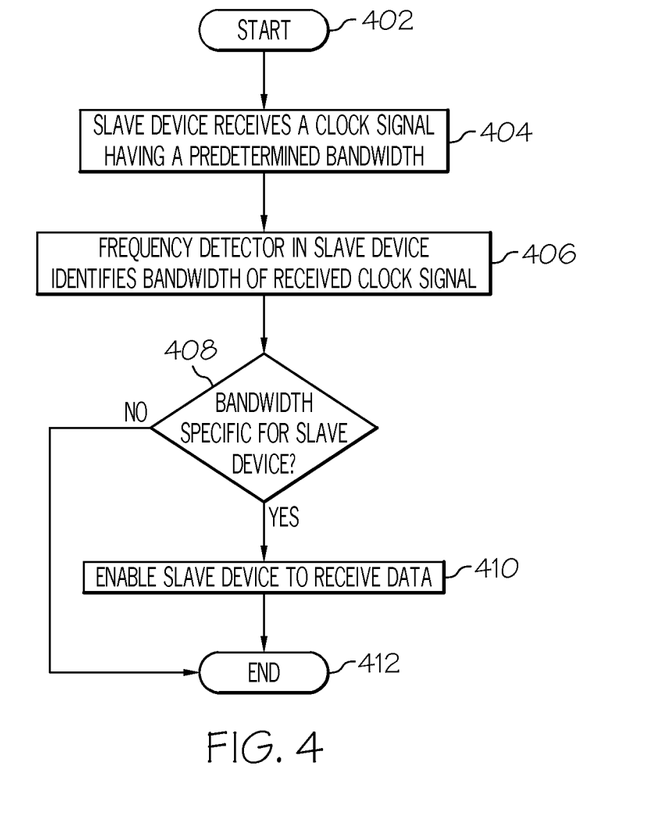
FIG. 4 is a high-level flow chart of exemplary steps performed by an SPI system to selectively enable a particular SPI slave device to engage in a data communication session with an SPI master device.

With reference now to FIG. 4, a high-level flow chart of an exemplary hardware-implemented method performed by an SPI system to selectively enable a particular SPI slave device to engage in a data communication session with an SPI master device, thus establishing a data communication session between a master device and a slave device, is presented. After initiator block 402, a master device (e.g., SPI master device 202 or 302 depicted in FIGS. 2-3) transmits a selected frequency signal, on a signal line, to a receiving slave device (block 404). Note that in one embodiment the signal line carries only a frequency signal that communicates no data. This selected frequency signal is generated by a frequency generator within the SPI master device. In one embodiment, the master device is an integrated circuit (IC) device, and the slave device is a peripheral chip device in the hardware system. As described in block 406, a frequency detector/comparator, which is in the slave device and coupled to the signal line, then determines if the selected frequency signal matches a predetermined frequency for the slave device. As described in query block 408, in response to the frequency detector/comparator determining that the clock frequency on the signal line matches the predetermined frequency for the slave device, the frequency detector/comparator enables a chip select node on that slave device, thus enabling a MOSI/MISO communication session between the master device and that slave device (block 410). The process ends at terminator block 412.

As described herein, in one embodiment the master device is a serial peripheral interface (SPI) master device, the slave device is an SPI slave device, and the data exchange session is performed over a master out slave in (MOSI) channel and a master in slave out (MISO) channel.

As described herein, in one embodiment the signal line is a clock line that couples the master device to multiple slave devices.

As described herein, in one embodiment, the signal line is a chip select line that couples a single chip select master node in the master device to a separate chip select slave node in each of multiple slave devices.

Figure 5:
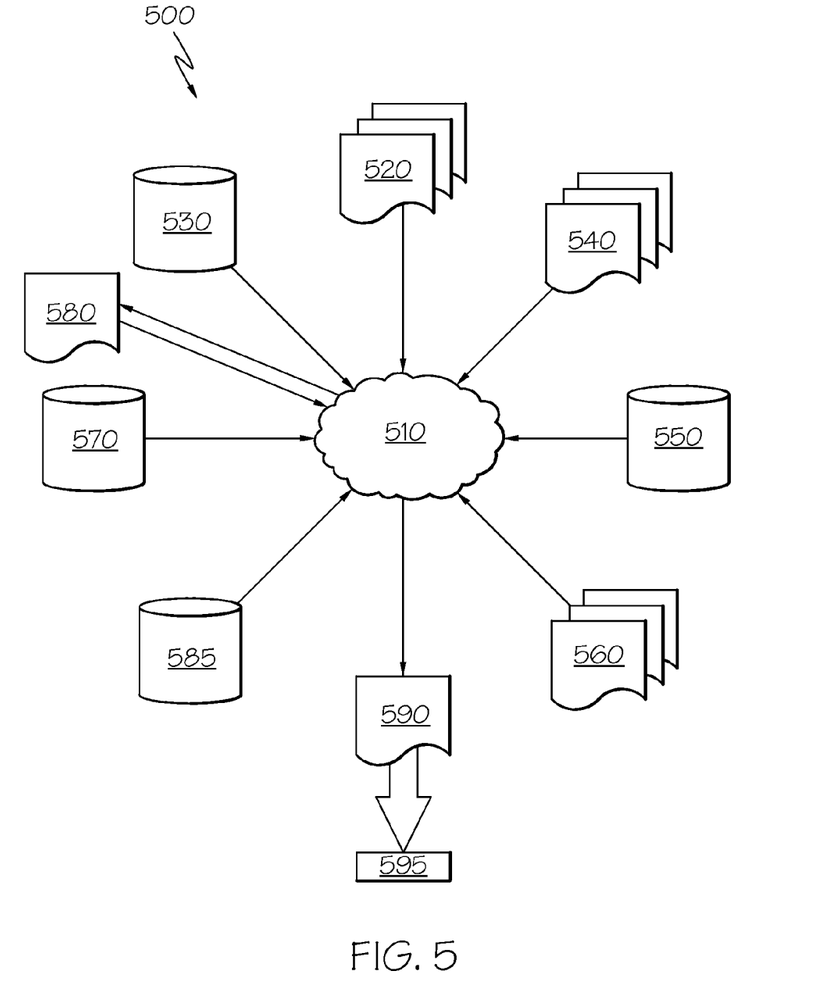
FIG. 5 is a flow diagram of a design process used in semiconductor design, manufacturing, and/or testing of the presently described exemplary SPI system.

With reference now to FIG. 5, there is depicted a block diagram of an exemplary design flow 500 used for example, in semiconductor IC logic design, simulation, testing, layout, and manufacturing. Design flow 500 includes processes, machines and/or mechanisms for processing design structures or devices to generate logically or otherwise functionally equivalent representations of the design structures and/or devices described above and shown in FIGS. 2-3. The design structures processed and/or generated by design flow 500 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 500 may vary depending on the type of representation being designed. For example, a design flow 500 for building an application specific IC (ASIC) may differ from a design flow 500 for designing a standard component or from a design flow 500 for instantiating the design into a programmable array, for example a programmable gate array (PGA) or a field programmable gate array (FPGA) offered by Altera® Inc. or Xilinx® Inc.

FIG. 5 illustrates multiple such design structures including an input design structure 520 that is preferably processed by a design process 510. Design structure 520 may be a logical simulation design structure generated and processed by design process 510 to produce a logically equivalent functional representation of a hardware device. Design structure 520 may also or alternatively comprise data and/or program instructions that when processed by design process 510, generate a functional representation of the physical structure of a hardware device. Whether representing functional and/or structural design features, design structure 520 may be generated using electronic computer-aided design (ECAD) such as implemented by a core developer/designer. When encoded on a machine-readable data transmission, gate array, or storage medium, design structure 520 may be accessed and processed by one or more hardware and/or software modules within design process 510 to simulate or otherwise functionally represent an electronic component, circuit, electronic or logic module, apparatus, device, or system such as those shown in FIGS. 2-3. As such, design structure 520 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 510 preferably employs and incorporates hardware and/or software modules for synthesizing, translating, or otherwise processing a design/simulation functional equivalent of the components, circuits, devices, or logic structures shown in FIGS. 2-3 to generate a netlist 580 which may contain design structures such as design structure 520. Netlist 580 may comprise, for example, compiled or otherwise processed data structures representing a list of wires, discrete components, logic gates, control circuits, I/O devices, models, etc. that describes the connections to other elements and circuits in an integrated circuit design. Netlist 580 may be synthesized using an iterative process in which netlist 580 is resynthesized one or more times depending on design specifications and parameters for the device. As with other design structure types described herein, netlist 580 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 510 may include hardware and software modules for processing a variety of input data structure types including netlist 580. Such data structure types may reside, for example, within library elements 530 and include a set of commonly used elements, circuits, and devices, including models, layouts, and symbolic representations, for a given manufacturing technology (e.g., different technology nodes, 32 nm, 45 nm, 50 nm, etc.). The data structure types may further include design specifications 540, characterization data 550, verification data 560, design rules 570, and test data files 585 which may include input test patterns, output test results, and other testing information. Design process 510 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 510 without deviating from the scope and spirit of the invention. Design process 510 may also include modules for performing standard circuit design processes such as timing analysis, verification, design rule checking, place and route operations, etc.

Design process 510 employs and incorporates logic and physical design tools such as HDL compilers and simulation model build tools to process design structure 520 together with some or all of the depicted supporting data structures along with any additional mechanical design or data (if applicable), to generate a second design structure 590. Design structure 590 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 520, design structure 590 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 2-3. In one embodiment, design structure 590 may comprise a compiled, executable HDL simulation model that functionally simulates the devices shown in FIGS. 2-3.

Design structure 590 may also employ a data format used for the exchange of layout data of integrated circuits and/or symbolic data format (e.g. information stored in a GDSII (GDS2), GL1, OASIS, map files, or any other suitable format for storing such design data structures). Design structure 590 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 2-3. Design structure 590 may then proceed to a stage 595 where, for example, design structure 590: proceeds to tape-out, is released to manufacturing, is released to a mask house, is sent to another design house, is sent back to the customer, etc.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A system comprising:
   a master device, wherein the master device is an integrated circuit (IC) device;
   multiple slave devices coupled to the master device by a clock line and a single chip select line;
   a frequency generator in the master device, wherein the frequency generator places a variable frequency signal on the single chip select line, wherein the single chip select line carries only frequency signals that communicate no data;
   a frequency detector/comparator in each of the multiple slave devices, wherein each frequency detector/comparator in each of the multiple slave devices is coupled to the single chip select line from the master device, wherein each frequency detector/comparator in each of the multiple slave devices determines whether the variable frequency signal on the single chip select line matches a predetermined frequency for a particular slave device, and wherein the predetermined frequency is received by the particular slave device from a particular frequency strap; and
   a chip select node on the particular slave device, wherein the chip select node is coupled to the frequency detector/comparator in the particular slave device, and wherein the chip select node, in response to the frequency detector/comparator determining that the variable frequency signal on the single chip select line matches the predetermined frequency for the particular slave device, is enabled to permit a data exchange session between the master device and the particular slave device.

2. The system of claim 1, wherein the master device is a serial peripheral interface (SPI) master device, wherein the particular slave device is an SPI slave device, and wherein the data exchange session is performed over a master out slave in (MOSI) channel and a master in slave out (MISO) channel.

3. The system of claim 1, wherein the clock line carries only a frequency signal that communicates no data.

4. The system of claim 1, wherein the multiple slave devices comprise an analog-to-digital converter (ADC), a digital-to-analog converter (DAC), an EPROM, an EEPROM, a FLASH memory, a thermometer, and a pressure gauge.

5. The system of claim 1, wherein the frequency generator in the master device places an unchanging clock signal on the clock line, wherein the unchanging clock signal has a frequency that is over 100 Mhz, and wherein the variable frequency signal on the single chip select line has a frequency that is less than 20 Khz.

6. A hardware description language (HDL) design structure encoded on a machine-readable data storage medium, said HDL design structure comprising elements that, when processed in a computer-aided design system, generate a machine-executable representation of a system, wherein said system comprises:

multiple slave devices coupled to the master device by a clock line and a single chip select line;

a frequency generator in the master device, wherein the frequency generator places a variable frequency signal on the single chip select line, wherein the single chip select line carries only frequency signals that communicate no data;

a frequency detector/comparator in each of the multiple slave devices, wherein each frequency detector/comparator in each of the multiple slave devices is coupled to the single chip select line from the master device, wherein each frequency detector/comparator in each of the multiple slave devices determines whether the variable frequency signal on the single chip select line matches a predetermined frequency for a particular slave device, and wherein the predetermined frequency is received by the particular slave device from a particular frequency strap; and a chip select node on the particular slave device, wherein the chip select node is coupled to the frequency detector/comparator in the particular slave device, and wherein the chip select node, in response to the frequency detector/comparator determining that the variable frequency signal on the single chip select line matches the predetermined frequency for the particular slave device, is enabled to permit a data exchange session between the master device and the particular slave device.

7. The HDL design structure of claim 6, wherein the master device is a serial peripheral interface (SPI) master device, wherein the particular slave device is an SPI slave device, and wherein the data exchange session is performed over a master out slave in (MOSI) channel and a master in slave out (MISO) channel.

8. The HDL design structure of claim 6, wherein the clock line carries only a frequency signal that communicates no data.

9. A hardware-implemented method of selectively establishing a data communication session between a master device and a slave device in a hardware system, the hardware-implemented method comprising:

a master device transmitting, on a clock line, an unchanging clock signal to multiple slave devices, wherein the master device is an integrated circuit (IC) device, and wherein the multiple slave devices are peripheral chip devices in the hardware system;

the master device transmitting, on a chip select line from the master device to the multiple slave devices, a variable frequency signal that has a frequency that is less than 20 KHz;

a frequency detector/comparator in each of the multiple slave devices determining whether the variable frequency signal on the chip select line matches a predetermined frequency for a particular slave device, wherein the frequency detector/comparator is coupled to the chip select line from the master device, and wherein the predetermined frequency is received by the particular slave device from a particular frequency strap; and the frequency detector/comparator enabling a chip select node on the particular slave device, wherein the chip select node is coupled to the frequency detector/comparator in the particular slave device, and wherein the chip select node, in response to the frequency detector/comparator determining that the variable frequency signal on the chip select line matches the predetermined frequency for the particular slave device, is enabled to permit a data exchange session between the master device and the particular slave device.

10. The hardware-implemented method of claim 9, wherein the master device is a serial peripheral interface (SPI) master device, wherein the particular slave device is an SPI slave device, and wherein the data exchange session is performed over a master out slave in (MOSI) channel and a master in slave out (MISO) channel.

11. The hardware-implemented method of claim 9, wherein the clock line carries only a frequency signal that communicates no data.

* * * * *